G. BACON.
Horseshoe.

No. 218,468.  Patented Aug. 12, 1879.

WITNESSES:
Francis McArdle.
C. Sedgwick

INVENTOR:
G. Bacon
BY Munn &Co
ATTORNEYS.

UNITED STATES PATENT OFFICE.

GEORGE BACON, OF WHITE, MICHIGAN.

IMPROVEMENT IN HORSESHOES.

Specification forming part of Letters Patent No. 218,468, dated August 12, 1879; application filed March 7, 1879.

*To all whom it may concern:*

Be it known that I, GEORGE BACON, of White, Hillsdale county, in the State of Michigan, have invented an Improvement in Horseshoes, of which the following is a specification.

The invention consists in a horseshoe provided with a spring attached to the under side of the toe, which is carried back in a median line to the heel, and then brought up in an enlarged form on a double or fold to support the frog of a horse's foot, as hereinafter more particularly described.

Figure 1:
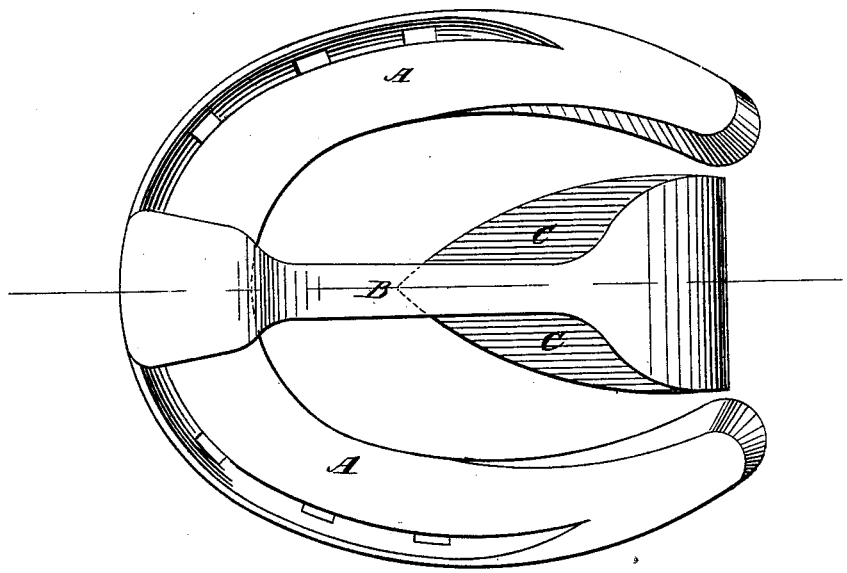
Figure 2:
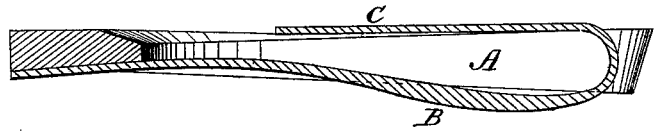

Figure 1 of the drawings is a bottom view, showing the relative position of the spring; and Fig. 2 is a median longitudinal section.

In the drawings, A represents a horseshoe of ordinary construction, and B C my spring attachment, which may be fastened under the toe by a screw or any suitable connection, the narrow shank B being extended back and below the shoe, then merging into a broad sheet, C, that is doubled over in such a position as to form a spring-rest for the frog of a horse's foot.

The part B of the spring first strikes the pavement or ground, and takes the impact yieldingly, thus preventing the usual ill effect upon the bones, tendons, and muscles of the leg, and by its pressure upon the frog keeping that spongy substance in a healthy condition.

What I claim as new is—

A horseshoe provided with the spring B C, having the part B below the shoe, and the part C arranged to support the frog, as shown and described.

GEORGE BACON.

Witnesses:
R. W. DRINKER,
SAMUEL JACOBUS.